Feb. 26, 1963 E. L. BAKER 3,078,984
GRIPPING DEVICE FOR TUBE DRAWING
Filed Sept. 15, 1960 3 Sheets-Sheet 1
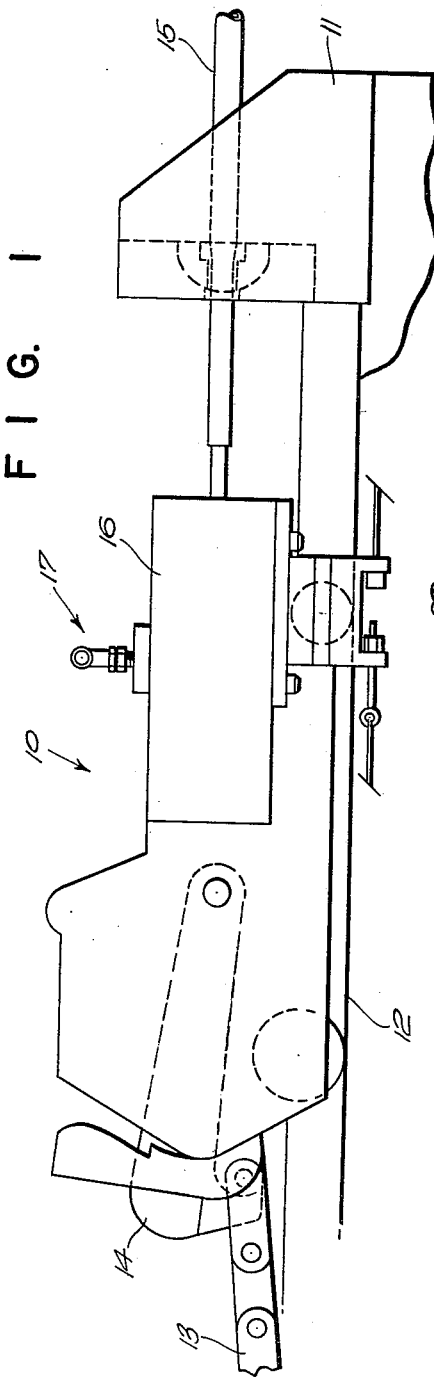
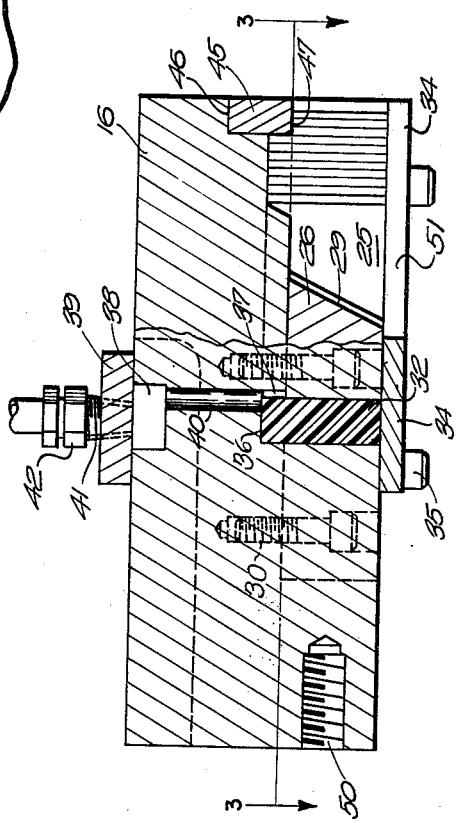
INVENTOR.
ELLERY L. BAKER
BY
Barlow & Barlow
ATTORNEYS Feb. 26, 1963 E. L. BAKER 3,078,984
GRIPPING DEVICE FOR TUBE DRAWING
Filed Sept. 15, 1960 3 Sheets-Sheet 2
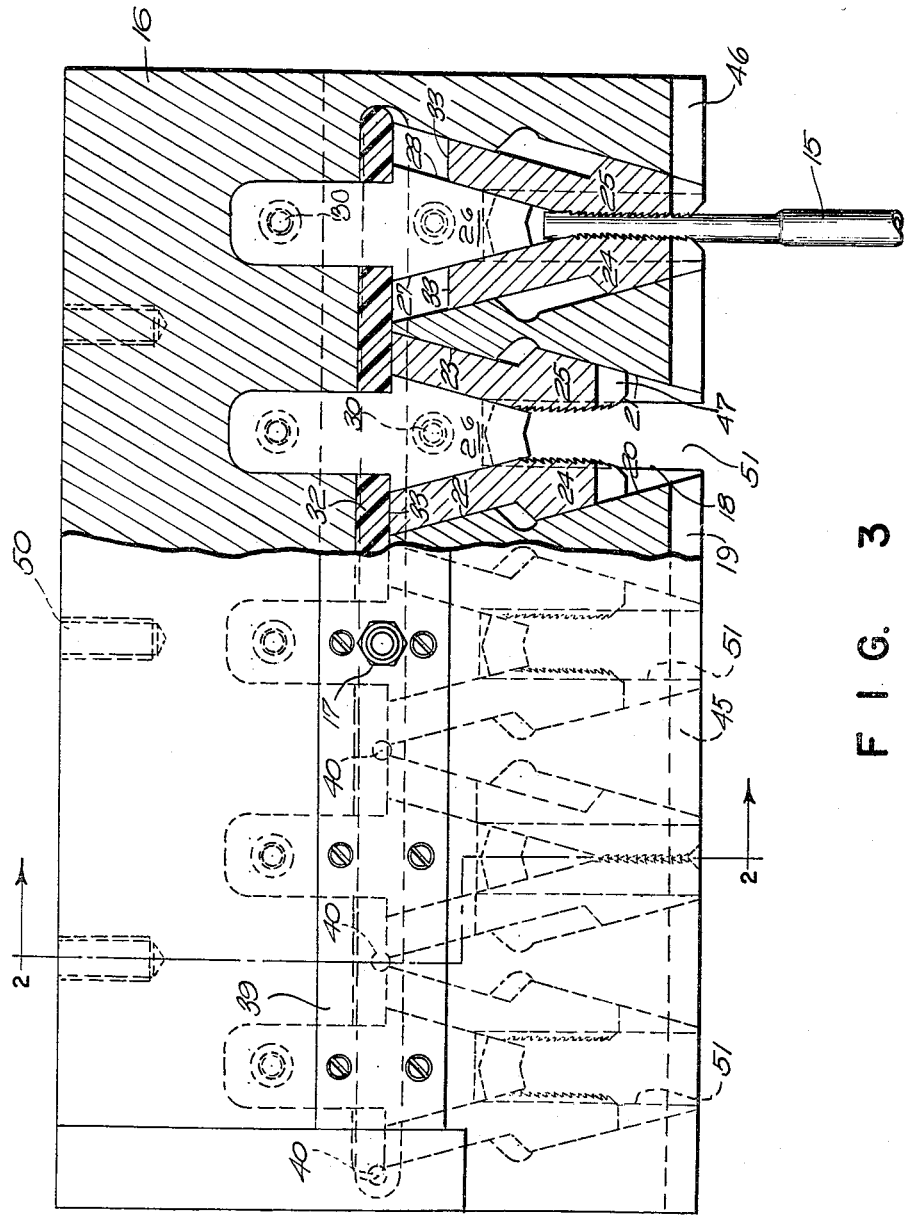
INVENTOR.
ELLERY L. BAKER
BY
Barlow & Barlow
ATTORNEYS Feb. 26, 1963  E. L. BAKER  3,078,984
GRIPPING DEVICE FOR TUBE DRAWING
Filed Sept. 15, 1960  3 Sheets-Sheet 3

INVENTOR.
ELLERY L. BAKER
BY
*Barlow & Barlow*
ATTORNEYS

United States Patent Office 3,078,984
Patented Feb. 26, 1963

3,078,984
GRIPPING DEVICE FOR TUBE DRAWING
Ellery L. Baker, Warwick, R.I., assignor to United Wire
 & Supply Corporation, a corporation of Rhode Island
Filed Sept. 15, 1960, Ser. No. 56,163
6 Claims. (Cl. 205—24)

This invention relates to a gripping device such as is mounted on the carriage of a drawbench for drawing metal tubes and the like.

The conventional way of gripping one or a plurality of tubes for drawing the same through dies to reduce their diameter comprises a device in which the jaws which contact and grip the tube are moved together by a rod either piston actuated by air or a spring mechanism which requires a number of parts and somewhat accurate relationship of the parts and symmetrical operation for the functioning of the gripping device.

One of the objects of this invention is to provide a device in which the number of parts may be materially reduced.

Another object of the invention is to provide a gripping device in which only the two jaws move to grip the tube.

Another object of the invention is to provide a gripping device in which each of the jaws are completely independent, one being movable completely independent of the other.

Another object of the invention is to provide a device which will grip the points of tubes which are somewhat crooked and which could not be gripped by jaws which were connected to move together in a symmetrical relation.

Another object of the invention is to provide a gripping device in which the jaws will not rebound to mark the tube after release therefrom.

Another object of the invention is to provide a gripping device in which, because of its reduced number of parts, may be less expensively produced than the conventional gripper.

Another object of the invention is to provide a gripping device in which because of its reduced number of parts will minimize the time in which it is out of service for repair.

Another object of the invention is to provide a gripping device in which less air pressure may be utilized for moving the jaws to gripping position than used by the conventional gripper.

Another object of the invention is to provide a device which will grip shorter points on the tube than heretofore, thus minimizing scrap.

Another object of the invention is to provide a gripping device, the jaws of which may be arranged closer together for multiple tube drawing, than has heretofore been possible in jaws conventionally operated.

With these and other objects in view, the invention consists of certain novel features of construction as will be more fully described and particularly pointed out in the appended claims.

In the accompanying drawings:

FIGURE 1 is an elevation, largely diagrammatic, showing a draw carriage and a portion of a draw bench for metal tubing;

FIGURE 2 is a section through the gripper head on substantially line 2—2 of FIGURE 3;

FIGURE 3 is a plan view, partly in section, the section portion being taken substantially on line 3—3 of FIGURE 2.

Figure 4:
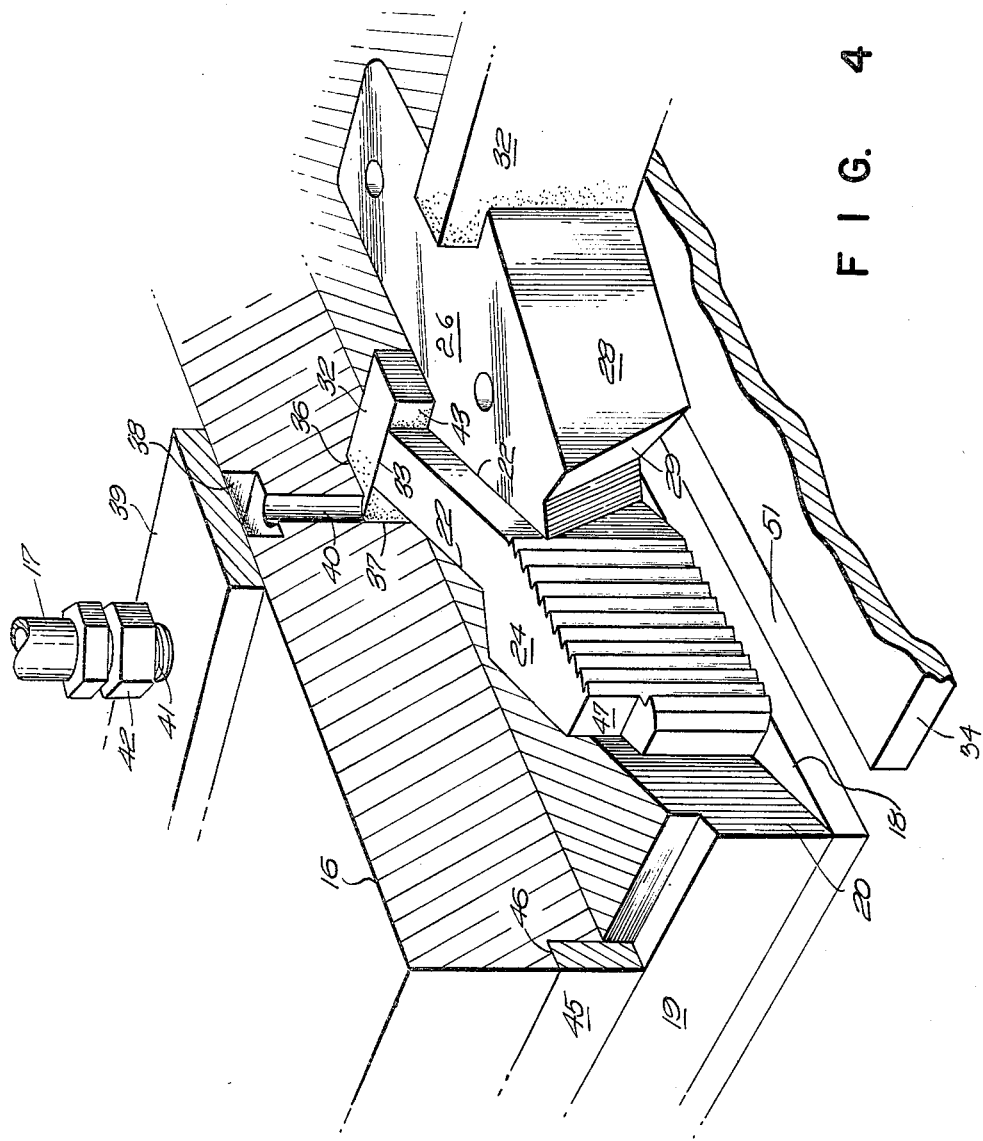
FIGURE 4 is a perspective view of a portion of the gripper head broken away to illustrate air channels and their relation to the gripping jaws.

In proceeding with this invention, I provide an air conduit in the gripper head which will lead directly to the rear surface of each of the jaws so that when the carriage is in a position adjacent the die to grip the tubes to be drawn and air is injected into the head to move the jaws into operating position, the air will impinge directly upon each of the jaws to move it into gripping position without the necessity of operating any piston or means common to two of the jaws to actuate them at one time or without the necessity of any intermediate parts. The solid head of the carriage may be provided with air channels by suitable recessing to provide the necessary conduits and the formation of the guiding surfaces for the jaws.

With reference to the drawings, 10 (FIGURE 1) designates generally the draw carriage for the gripping device of a drawbench with the support 11 for the dies from which the track 12 extends and along which the carriage is moved by the chain 13 with which the hook 14 engages for movement of the carriage. The gripping jaws for one or a plurality of work tubes 15 are located in the head 16 of the carriage while the air connection thereto is designated generally 17.

This head 16 (see FIGURES 3 and 4) is essentially a solid block of metal which is provided with recesses 18 cut inwardly from its lower and forward surfaces, there being one of these recesses for each pair of jaws provided in the head 16. Each of the recesses being the same, only one will be described. A recess 18 opens rearwardly from the front surface 19 to provide a pair of walls 20 and 21, which diverge as they extend inwardly and are stepped to provide cooperating inner guides 22 and 23 for the outer surfaces of jaws 24 and 25. An ejector block 26 of a vertical thickness less than that of the jaws is located in this recess and provides guide walls 27 and 28 for the inner surfaces of the jaws 24 and 25. This ejector block 26 is made as an insert in the head 16 because it is desirable that it be of hardened metal, such as hardened steel, so that its inclined ejecting surface 29 will withstand the continual battering it receives from the tube 15 as it is ejected from the head. The ejector blocks 26 are secured in the head by bolts 30 (FIGURE 2) extending through the ejector blocks and into the head 16 so as to firmly mount them in place. A bottom plate 34 serves as a support for the jaws which may slide along this plate but is slotted as at 51 from its edge to the ejector block 26 for the tube to escape when the jaws let go. This plate 34 is held in place by cap screws 35 suitably positioned and threaded into the head 16. A bar 45 is set into a recess 46 on the forward edge 19 of head 16 to prevent the jaws from escaping from the recess 18, the jaws being notched at 47 in their forward ends to receive the bar 45.

The inner end of the recess 18 at either side of the ejector block is provided with an elastomeric wall 32 comprising rubber or some synthetic rubber against which the ends 33 of the jaws engage. Extending widthwise of the head 16 at the inner end of the recesses 18 a channel 36 connects adjacent recesses 18 and receives the upper edge of the elastomeric wall 32. This channel 36 is of a dimension in the direction of the thickness of the wall 32 greater than the thickness of the wall to leave an air passage from recess 18 to recess 18 on the forward side of the wall. A manifold groove 38 in the upper surface of the head extends widthwise substantially the width of the head and is covered by a plate 39 to provide a conduit to which air is supplied through conduit 17, when the head is in position to pick up the tubes 15. This conduit extends a distance sufficient to reach the ends of the outside jaws on the outside pairs of jaws in the head and at locations close to the ends of adjacent jaws 24 and 25 and at a location adjacent the ends of jaw 24 at one side of the head and jaw 25 at the other side of the head there are holes 40 which lead from channel 38. A threaded pipe plug 41 having a hexagonal head 42 serves to secure air device 17 to this head so that air may be injected into the head at the location of the die when the head is being loaded. At the time the air enters, it is under sufficient pressure so as to send a blast into manifold conduit 38 and thence through each of the holes 40 to the end of the jaws 24 and 25, causing them under this blast of air to move forwardly to grip a tube, such as 15, which has been positioned in the head. Air under pressure of substantially 60 p.s.i. is suitable for this purpose. The space 37 serves to provide a passage for air to a location along the entire upper portion of the inner part of the jaw, such as 24, and as there is always at least a crack between the end wall 33 and the surface 43 of the elastomeric wall 32, air will creep down into this crevice sufficient to start jaw 24 forwardly and as the jaw starts to move forwardly further air can enter and force the jaw forwardly until it engages the work tube, such as 15.

It will be noted that the jaws 24 and 25 are in no way connected with each other. Thus each one will move forwardly under action of the air behind it until it engages the tube and if the tube is bent or off center one jaw may move forwardly much further than the other jaw, so as to grip the end of the tube, which is accomplished by reason of the independence of the movement of the jaws and yet a good grip on the work may be had, whereas in jaws which are connected together in some way a tube of such offset or bent form would not be gripped at all. Once the jaws are engaged with the tube, the movement of the carriage and head will of course maintain the gripping on the work without any air pressure.

The head 16 is tapped as at 50 for attachment to the carriage.

I claim:

1. In a tube gripping device for a draw bench, a head, converging guiding surfaces carried by said head for directing the movement of gripping jaws, each guiding surface providing a wall of a chamber having one end open, a jaw entering the open end of each chamber and engaging said guiding surface, a conduit leading to said chambers for directing fluid to the end of each jaw to move the jaws by air directly contacting the inner ends of the jaws whereby a pair of jaws are caused to converge and grip a tube to be drawn.

2. In a tube gripping device for a draw bench, a head, converging guiding surfaces carried by said head for directing the movement of a pair of gripping jaws, each guiding surface providing the wall of one of two chambers having one end open, a pair of jaws in said head, each entering the open end of one of said chambers and engaging one of said converging guiding surfaces, each jaw being completely independent and not connected to the other, a conduit leading to the inner ends of said chambers for directing air to the ends of said jaws to move the jaws by air directly contacting the inner ends of the jaws, whereby the jaws may move in converging relation independently in accordance with resistance encountered.

3. In a tube gripping device as in claim 1 wherein the guiding surfaces are the walls of a recess in a head.

4. In a tube gripping device as in claim 1 wherein the head is solid and the guiding surfaces are the walls of a recess in said head.

5. In a tube gripping device as in claim 1 wherein the head is solid and the guiding surfaces are the walls of a recess in said head and the conduit is also formed by a recess in said head.

6. In a tube gripping device as in claim 2 wherein there are a plurality of pairs of jaws and a common conduit with branches connecting an air supply to all of said pairs of jaws.

References Cited in the file of this patent

UNITED STATES PATENTS

| | | |
|---|---|---|
| 2,340,949 | Evans | Feb. 8, 1944 |
| 2,410,594 | Andrews et al. | Nov. 5, 1946 |
| 2,845,171 | Heym | July 29, 1958 |
| 2,864,148 | Wait | Dec. 16, 1958 |
| 2,873,121 | Hahn | Feb. 10, 1959 |
| 2,873,849 | Lombard | Feb. 17, 1959 |
| 3,005,968 | Jones et al. | Oct. 24, 1961 |